US011544176B1

(12) United States Patent
Pandurangarao et al.

(10) Patent No.: US 11,544,176 B1
(45) Date of Patent: Jan. 3, 2023

(54) SYSTEMS AND METHODS FOR AUTOMATICALLY ASSESSING AND CONFORMING SOFTWARE DEVELOPMENT MODULES TO ACCESSIBILITY GUIDELINES IN REAL-TIME

(71) Applicants: Allstate Insurance Company, Northbrook, IL (US); Allstate Solutions Private Limited, Bangalore (IN)

(72) Inventors: Anil Kumar Pandurangarao, Buffalo Grove, IN (US); Sudharshun Ravichander, Des Plaines, IL (US); Andrew Pulley, Palatine, IL (US); Pramod Lekkala, Whitefield (IN)

(73) Assignees: ALLSTATE INSURANCE COMPANY, Northbrook, IL (US); ALLSTATE SOLUTIONS PRIVATE LIMITED, Bangalore (IN)

( * ) Notice: Subject to any disclaimer, the term of this patent is extended or adjusted under 35 U.S.C. 154(b) by 4 days.

(21) Appl. No.: 17/366,629

(22) Filed: Jul. 2, 2021

Related U.S. Application Data

(63) Continuation of application No. 16/735,807, filed on Jan. 7, 2020, now Pat. No. 11,055,208.

(51) Int. Cl.
*G06F 9/44* (2018.01)
*G06F 11/36* (2006.01)
(Continued)

(52) U.S. Cl.
CPC ............ *G06F 11/3684* (2013.01); *G06F 8/70* (2013.01); *G06F 16/958* (2019.01); *G06F 16/9577* (2019.01)

(58) Field of Classification Search
CPC .............. G06F 11/3684; G06F 16/958; G06F 16/9577; G06F 8/70
(Continued)

(56) References Cited

U.S. PATENT DOCUMENTS 7,162,526 B2   1/2007   Dutta et al.
7,240,279 B1   7/2007   Chartier et al.
(Continued)

FOREIGN PATENT DOCUMENTS

JP          4448724 B2      4/2010
JP       2010108141 A       5/2010
(Continued)

OTHER PUBLICATIONS

"Testing for Accessibility" UCSF Digital Accessibility https://digitalaccess.ucsf.edu/test-your-site website visited Nov. 15, 2019, pp. 1-3.
(Continued)

*Primary Examiner* — Chuck O Kendall
(74) *Attorney, Agent, or Firm* — Dinsmore & Shohl LLP

(57) ABSTRACT

Systems and methods are disclosed for automatically assessing and conforming software development modules to accessibility guidelines in real-time. The systems may facilitate an incremental development of applications. One or more modules or base codes of the application, as they are developed, may be tested for compliance to various accessibility standards (e.g., Web Content Accessibility Guidelines 2.0). If a module or base does not meet a specific threshold of compliance, systems and methods allow for an automatic modification of the module or base code to make it more compliant to the accessibility standards.

20 Claims, 4 Drawing Sheets

(51) Int. Cl.
*G06F 16/958* (2019.01)
*G06F 16/957* (2019.01)
*G06F 8/70* (2018.01)

(58) Field of Classification Search
USPC .................................................. 717/124–130
See application file for complete search history.

(56) References Cited

U.S. PATENT DOCUMENTS

| | | | |
|---|---|---|---|
| 7,448,023 | B2 | 11/2008 | Chory et al. |
| 7,778,866 | B2 | 8/2010 | Hughes |
| 8,166,135 | B2 | 4/2012 | Ganesh et al. |
| 8,196,104 | B2 | 6/2012 | Cohrs et al. |
| 8,406,528 | B1 | 3/2013 | Hatwich |
| 8,572,549 | B2 | 10/2013 | Ganesh et al. |
| 8,732,017 | B2 | 5/2014 | Attenberg et al. |
| 8,935,262 | B2 | 1/2015 | Heber |
| 9,996,613 | B2 | 6/2018 | Jadhav et al. |
| 11,327,874 | B1 * | 5/2022 | Klein .................. G06F 11/3664 |
| 2004/0148568 | A1 | 7/2004 | Springer |
| 2005/0160065 | A1 | 7/2005 | Seeman |
| 2006/0282771 | A1 | 12/2006 | Vinci |
| 2018/0013657 | A1 | 1/2018 | Cantwell et al. |
| 2019/0073365 | A1 | 3/2019 | Jamshidi |

FOREIGN PATENT DOCUMENTS

| | | |
|---|---|---|
| WO | 2007096603 A2 | 8/2007 |
| WO | 2015128327 A1 | 9/2015 |
| WO | 2018148619 A2 | 8/2018 |

OTHER PUBLICATIONS

"Built on the WAVE Engine" Pope Tech Features https://pope.tech/features website visited Nov. 15, 2019, pp. 1-7.

"Access Alchemy" Level Access https://www.levelaccess.com/solutions/software/access-alchemy/ website visited Nov. 15, 2019, pp. 1-2.

"Create More Accesible, Inclusive Web Content" Siteimprove https://siteimprove.com/en/accessibility/ website visited Nov. 15, 2019, pp. 1-6.

"WorldSpace Comply" Enterprise Accessibility Monitoring & Reporting https://www.deque.com/tools/worldspace-comply/ website visited Nov. 15, 2019, pp. 1-4.

Feb. 18, 2021—U.S. Notice of Allowance—U.S. Appl. No. 16/735,807.

* cited by examiner

SYSTEMS AND METHODS FOR AUTOMATICALLY ASSESSING AND CONFORMING SOFTWARE DEVELOPMENT MODULES TO ACCESSIBILITY GUIDELINES IN REAL-TIME

CROSS REFERENCE TO RELATED APPLICATIONS

This application is a continuation of U.S. patent application Ser. No. 16/735,807, filed Jan. 7, 2020, which is incorporated herein by reference in its entirety.

TECHNICAL FIELD

Aspects of the disclosure generally relate to software development platforms. In particular, various aspects of the disclosure include a framework for automatically assessing and conforming software development modules to accessibility guidelines in real-time.

BACKGROUND

Software developers are increasingly trying to make applications accessible to populations that have visual, hearing, motor, or cognitive disabilities. These populations are typically unable to reap the benefits of many software applications. For example, these populations living with disabilities may be unable to discern various graphics presented by a software application, hear sounds caused by software application, or respond by moving the mouse, keyboard, or other input modules. Software applications may be tested for how well they are made accessible to people with disabilities through web accessibility standards. For example, versions of the Web Content Accessibility Guidelines (WCAGs) (e.g., WCAG 1.0, WCAG 2.0, etc.) are a set of standard guidelines put together by a consortium that outlines how software applications can be compliant. Software developers may use testing applications based on these accessibility standards to redevelop older, non-compliant software applications into newer software applications that comply with the accessibility standards. Yet, the process of redeveloping old software applications is often laborious and inefficient. There is a desire for a system, method, and platform for developing new software efficiently and seamlessly, where each component of the software during its development can be readily tested for compliance to and redeveloped to conform to accessibility standards in real-time. Various embodiments described herein may address one or more of the shortcomings described above.

SUMMARY

In light of the foregoing background, the following presents a simplified summary of the present disclosure in order to provide a basic understanding of some aspects of the features described herein. This summary is not an extensive overview of all of the features described herein. The following summary merely presents some concepts in a simplified form as a prelude to the more detailed description provided below.

Systems and methods are described for automatically assessing and conforming software development modules to accessibility guidelines in real-time. One example method comprises: receiving, by a first computing device having at least one processor, a request to test a plurality of modules of a software application for accessibility compliance in real-time, wherein each of the plurality of modules comprises a plurality of base codes; for each of the plurality of modules of the software application: identifying the plurality of base codes of each of the plurality of modules; and for each of the plurality of base codes of each of the plurality of modules of the software application development: determining one or more accessibility compliance provisions that are relevant to a given base code of the plurality of base codes; determining, based on the determined one or more accessibility compliance provisions, one or more accessibility compliance test tools corresponding to the one or more accessibility compliance provisions; and determining a test tool-specific accessibility compliance score for each of the one or more accessibility compliance test tools; aggregating, for each of the plurality of modules of the software application, the test tool-specific accessibility compliance score of each of the one or more accessibility compliance test tools for each of the plurality of base codes; generating a plurality of module-specific accessibility compliance scores corresponding to the plurality of modules; and identifying, based on the plurality of module-specific accessibility compliance scores corresponding to the plurality of modules, one or more modules needing improvement in accessibility compliance, wherein the receiving, the aggregating, the generating, and the identifying of the one or more modules needing improvement occur in real-time.

In accordance with some arrangements of the present disclosure, another example method comprises: receiving, by a first computing device having at least one processor, a base code to be tested for accessibility compliance, wherein the base code is one of a plurality of components of a software module; determining a program executed by the base code; assigning, based on the generated program, one or more program category tags; determining one or more accessibility compliance provisions corresponding to the one or more program tags; determining, based on the determined one or more accessibility compliance provisions, one or more accessibility compliance test tools corresponding to the one or more accessibility compliance provisions; determining a test tool-specific accessibility compliance score for each of the one or more accessibility compliance test tools; aggregating the test tool-specific accessibility compliance score of each of the one or more accessibility compliance test tools to generate a base code-specific accessibility compliance score for the base code; and determining, based on the base code-specific accessibility compliance score failing to satisfy a threshold, that the base code needs improvement in accessibility compliance, wherein the receiving the base code to be tested for accessibility compliance and the determining that the base code needs improvement in accessibility compliance occur in real-time.

In accordance with some arrangements of the present disclosure, an example system comprises: one or more processors; and memory storing computer-executable instructions that, when executed by the one or more processors, cause the system to: receive a request to test one or more modules of a software application for accessibility compliance in real-time, wherein each of the one or more modules comprises a plurality of base codes; for each of the plurality of base codes of each of the plurality of modules: determine one or more accessibility compliance provisions that are relevant to a given base code of the plurality of base codes; determine, based on the determined one or more accessibility compliance provisions, one or more accessibility compliance test tools corresponding to the one or more accessibility compliance provisions; and determine a test tool-specific accessibility compliance score for each of the one or more accessibility compliance testing tools; aggregate, for each of the one or more modules of the software application, the test tool-specific accessibility compliance scores to generate one or more module-specific accessibility compliance scores corresponding to the one or more modules; and identify, based on the one or more module-specific accessibility compliance scores corresponding to the plurality of modules, a module needing improvement in accessibility compliance, wherein the receiving, the aggregating, and the identifying occur in real-time.

In accordance with some examples of the present disclosure, one or more non-transitory computer readable media store computer-executable instructions. When these computer-executable instructions are executed by a computing device, the computing device may perform one or more of the methods described herein.

Other features and advantages of the disclosure will be apparent from the additional description provided herein.

The methods and systems of the above-referenced arrangements may also include other additional elements, steps, computer-executable instructions, or computer-readable data structures. In this regard, other embodiments are disclosed and claimed herein as well. The details of these and other embodiments are set forth in the accompanying drawings and the description below. Other features and advantages will be apparent from the description, drawings, and claims.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration, various embodiments of the disclosure that may be practiced. It is to be understood that other embodiments may be utilized.

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
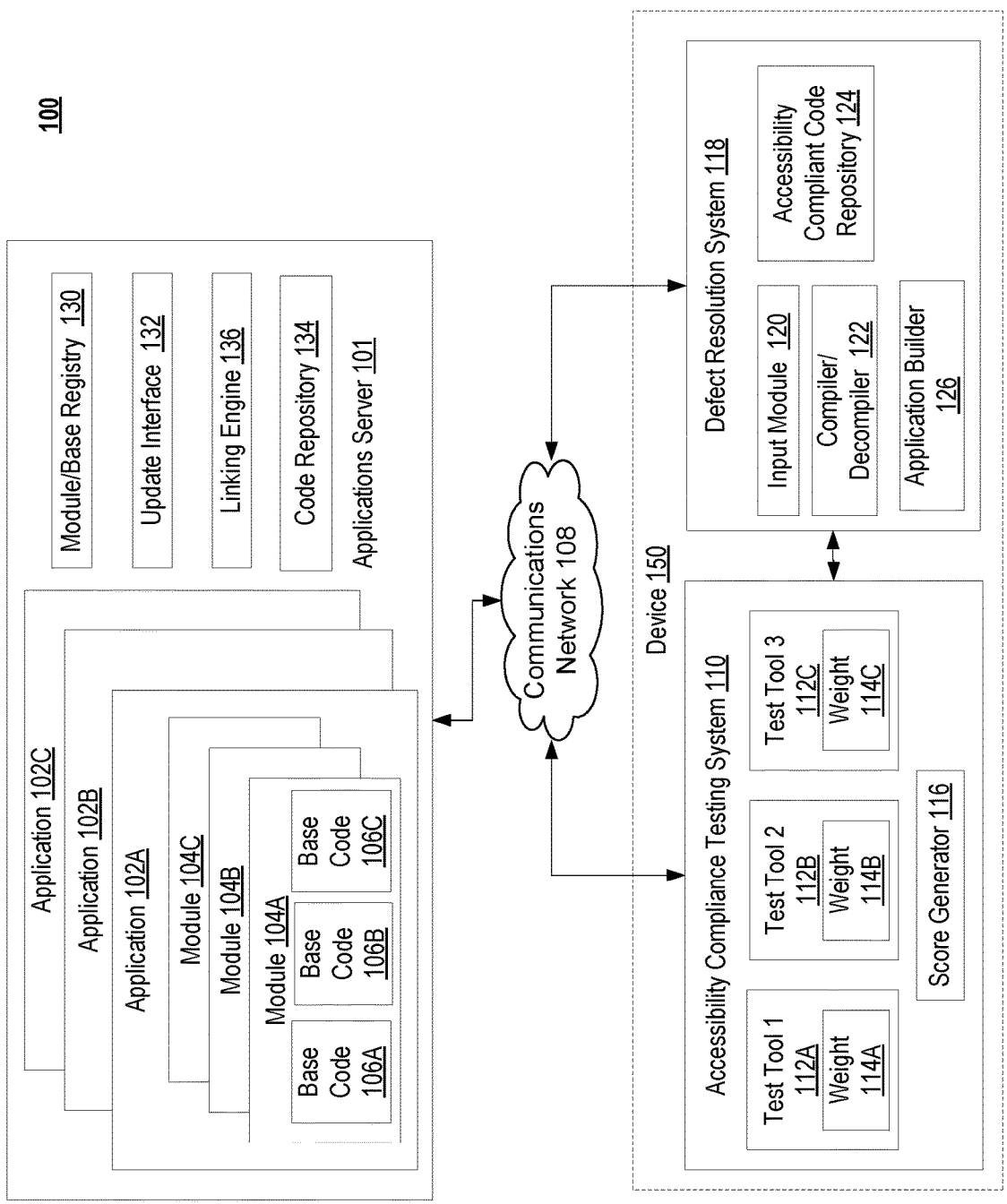
FIG. 1 illustrates a network environment and computing systems that may be used to implement aspects of the disclosure.

FIG. 1 illustrates a block diagram of a network environment and computing systems (e.g., devices, servers, application program interfaces (APIs), etc.) that may be used to implement aspects of the disclosure. At a high level the network environment 100 may comprise one or more applications servers 101 (e.g., for applications 102A-102C), an accessibility compliance testing system 110, and a defect resolution system 118 interconnected over a communications network 104.

The communication network 108 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 108 may use a series of interconnected communication links (e.g., coaxial cables, optical fibers, wireless links, etc.) to facilitate communication between the applications server 101, the accessibility compliance testing system 110, defect resolution system 118, and any external devices or systems. Each of the above-described systems may function on one or more computing systems or devices. In some aspects, one or more of the above described systems and servers may be connected; be a part of another one of the above-described systems and servers; or be components, features, or functions of a bigger computing system. For example, the accessibility compliance testing system 110 and the defect resolution system 118 may be different components, features, or functions of a single computing system.

The one or more computing systems or devices of the above-described systems (e.g., applications server 101, the accessibility compliance testing system 110, defect resolution system 118) may include, for example, desktops, servers, smart phones, tablets or laptop computers with wired or wireless transceivers, tablets or laptop computers communicatively coupled to other devices with wired or wireless transceivers, and/or any other type of device configured to communicate via a wired or wireless network. As will be described in FIG. 2, the computing systems or devices may include at least a processor and a communication interface (e.g., network I/O) to communicate with one another.

Companies, organizations, and developers may often look for ways to make existing applications and software compliant with accessibility standards. The network environment 100 provides a network of systems and servers that helps developers make applications and software that are compliant with various accessibility standards at the point closest to code creation or earliest point of influence. One of the ways may include developing applications (e.g., application 102A) in piecemeal (e.g., incrementally) by developing one or more modules (e.g., modules 104A-104C) of the application, testing each module for accessibility compliance, and resolving any defects. Also or alternatively, each module of the application may be developed in piecemeal by developing the base codes (e.g., base codes 106A-106C) of the module, testing each base code for accessibility compliance, and resolving any defects.

As each piece of the application (e.g., by base code or by module) is being developed, the accessibility compliance testing system 110 can test how well the piece is compliant with various accessibility standards. The accessibility compliance testing system 110 may be one or more standalone or connected devices, servers, applications, or plug-ins that receive, from the applications server 101, a piece of an application (e.g., a module or a base code) for testing. The accessibility compliance testing system 110 may rely on various test tools (e.g., test tool 1, 112A, test tool 2, 112B, test tool 3, 112C, etc.) to test the increment of the application for its compliance with various accessibility standards. The accessibility compliance testing system 110 may generate a score for how well the specific increment is compliant with an accessibility standard via the score generator 116. The assessment provided by the various test tools may be given weights (e.g., weights 114A-114C) based on how well or how relevant a test tool is in assessing the compliance to an accessibility standard. Each test tool may pertain to a specific accessibility standard being tested. For example, a test tool such as the Color Contrast Analyzer may determine whether a specific piece of the application provides good color visibility, e.g., for a user that may have visual impairment. Furthermore, the accessibility compliance testing system 110 may indicate (e.g., via the score) defects with a specific piece (e.g., specific modules or specific base codes) of the application. These defects may signify that the specific module or base code does not comply with an accessibility standard or otherwise is weak in its compliance. An individual score provided by a specific test tool may indicate a defect concerning a specific accessibility compliance standard. However, the score generator 116 may provide a comprehensive score for a piece of the application based on the weighted combination of one or more of the respective individual scores.

The defect resolution system 118 may be one or more standalone or connected devices, servers, applications, or plug-ins, or an aspect of the accessibility compliance testing system 101. Like the application compliance testing system 101, the defect resolution system 118 may also receive the piece of the application (e.g., module or base code) tested for accessibility compliance, as well as any indications of a defect. The defect may be an underperformance towards or non-compliance to an accessibility standard. The defect resolution system 118 may address the defect by automatically suggesting accessibility compliant replacements for the defective piece of the application (e.g., an AWA compliant base code or an AWA compliant module). The AWA compliant replacements may be stored in the AWA compliant code repository 124. Also or alternatively, the defect resolution system 118 may allow a user to manually fix the defective piece of the software based on the results of the accessibility compliance testing performed by the accessibility compliance testing system 110. The user may fix the defective piece via an input module 120, which may comprise any electronic hardware for allowing a user to input instructions or code (e.g., keypad, mouse, touchscreen, etc.). Whether the defect is manually or automatically addressed, a compiler/decompiler 122 may be used to execute the AWA-compliant code or the manually entered replacement code, e.g., to test whether the defect has been overcome. Furthermore, after the defect has been detected, the compiler/decompiler 122 may also be used to extract the source code that produces the defective piece of the application. For example, if a specific testing tool, namely the Color Contrast Analyzer, determined that a module of an application provides poor color contrast, the compiler/decompiler 122 may be used to generate a source code (e.g. in HyperText Markup Language (HTML), JavaScript, Cascading Style Sheets (CSS), PHP, etc.) that is responsible for generating the module with the poor color contrast. Through the input module 120, a user may be able to rewrite and/or reprogram the source code to create a module with a better color contrast. In some aspects, the defect resolution system 118 may further comprise an application builder 126. The application builder 126 may be used to integrate one or more pieces of the application together, e.g., to determine whether the defect has been overcome.

The applications server 101 may comprise one or more standalone or connected devices, servers, application servers, application program interfaces (APIs), or software development kits that manage the development of one or more applications software. Furthermore, the applications server 101 may help develop accessibility compliant applications in piecemeal (e.g., modular development) so as to test and resolve defects in applications at points close to code creation. Also or alternatively, the applications server 101 may comprise one or more servers that manage existing applications. Thus, the application server 101 may communicate with the accessibility compliance testing system 110 and the defect resolution system 118 to test pieces of the existing application for accessibility compliance and resolve defects to make the existing application more compliant with accessibility standards. The applications server 101 may comprise one or more applications (e.g., applications 102A-102C) that may be functioning (e.g., complete) or undergoing development. Each application may comprise one or more modules (e.g., modules 104A-104C), and each module may comprise one or more base codes (e.g., base codes 106A-106C). In various embodiments, a base code may refer to any collection of source code used to build a particular module for a software. A module may refer to any subset or component of a software or application.

It is contemplated that some base code or source code may be shared between one or more modules of an application or among one or more applications. Thus, modular code (e.g., source code for a module) or base code may be stored in a code repository 134, e.g., for use in several modules or applications. This shared or common code can then be packaged and/or iteratively versioned for use by one or more modules or applications. The packaged and versioned base code used by modules or base codes of applications may also or alternatively be stored in a registry (e.g., module/base code registry 130). The module/base code registry 130 may comprise a package management system (e.g., Node Package Manager (NPM)) for web-based components. A linking engine 136 may assist in mapping, packaging, or versioning the various source code stored in the code repository 134 to the various modules, base codes, or applications that the applications server manages.

The applications server 101 may further comprise an update interface 132 for allowing changes to any code stored in the code repository 134 and/or the module/base code registry 130. For example, after a piece of an application (e.g., a module or a base code) has been tested for accessibility compliance, and a defect had been detected, the update interface may allow an accessibility compliant replacement code to be inserted into the original source code for the defective piece of the application. The update interface 132 may allow a user or the defect resolution system 118 to render such changes, for example, by performing "create, read, update, and delete" (CRUD) functions on the source code.

Furthermore, the code repository 134 and/or the module/base code registry 130 may provide an "at a glance" insight for a user into a source code behind a module or application. The insight may include, for example, open issues, number of updates in recent months, downloads or popularity. A user may access this insight and obtain WCAG Grade regarding compliance procedures results via a computing device. The computing device that the user may use may comprise, or process, any one or more of the computing systems presented above (e.g., applications server 101, accessibility compliance testing system 110, or defect resolution system 118).

Figure 2:
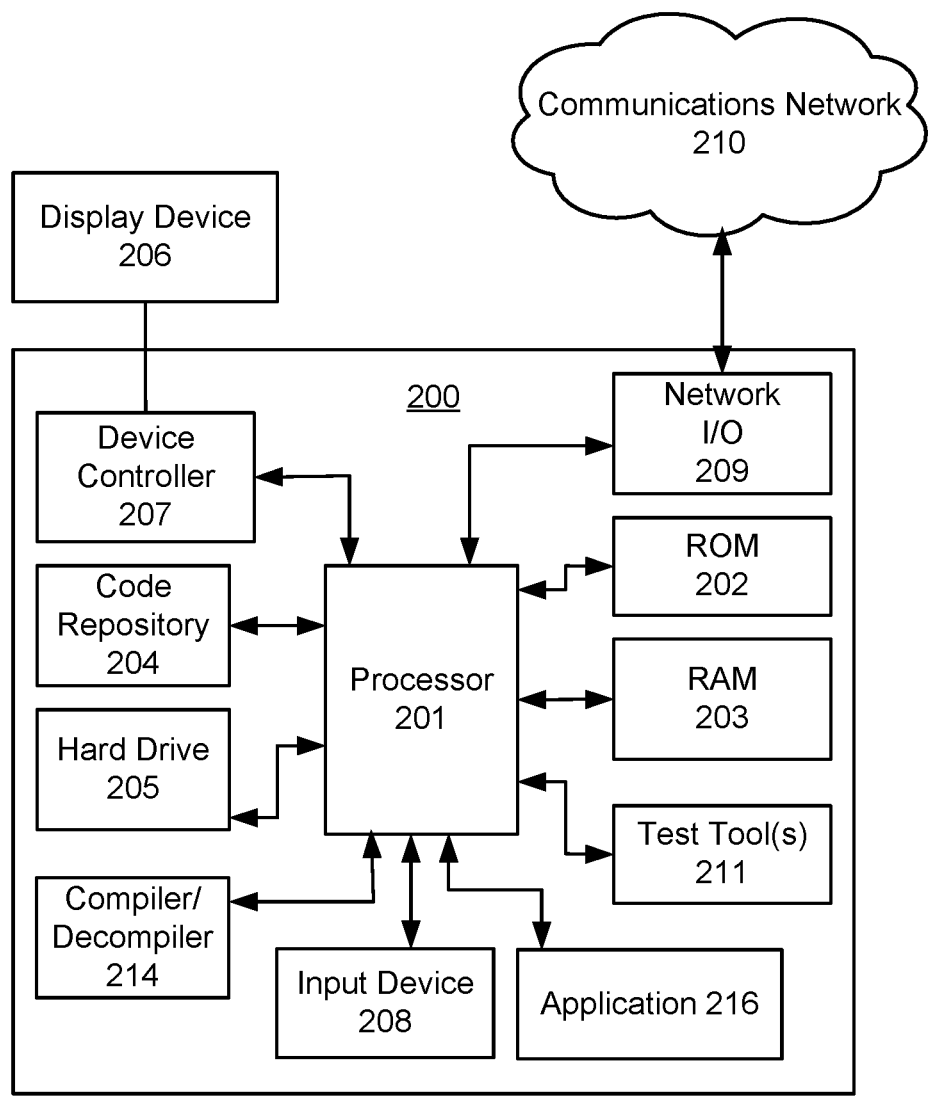
FIG. 2 is a diagram of an example computing system that may be used for modular software development of accessibility for web applications in real-time, according to one or more aspects of the disclosure.

FIG. 2 shows hardware elements of a computing device 200 that may be used to implement any one or more of the systems or servers shown in FIG. 1 (e.g., applications server 101, accessibility compliance testing system 110, and defect resolution system 118) and any other systems discussed herein. In some aspects, where one or more of the systems described in FIG. 1 are components of a greater system, the computing device may be used to implement the greater system. For example, the computing device may be used to implement a system that performs the functions of the accessibility compliance testing system 110 and the defect resolution system 118. In such aspects, the computing device may include one or more of the components described in the accessibility compliance testing system 110 and the defect resolution system 118.

The computing device 200 may be one used to assess and conform software development modules with accessibility guidelines. The accessibility guidelines may be any one of guidelines, standards, or rules adopted by organizations for making the electronic content more accessible to disadvantaged people. These accessibility guidelines may include, for example, any version of the Web Content Accessibility Guidelines (WCAG) (e.g., WCAG 1.0, WCAG 2.0, etc.), Section 508 of the Rehabilitation Act, etc. In various embodiments, an accessibility compliance provision, accessibility provision, or an accessibility standard may refer to a specific provision, rule, or item of the accessibility guidelines that is being tested for, or being complied with, by a piece (e.g., a module or base code) of an application. A base code or a module of an application may be accessibility compliant for a specific accessibility provision if the base code or the module satisfies or meets the specific accessibility provision.

The computing device 200 may comprise one or more processors 201, which may execute instructions of a computer program to perform any of the functions described herein. The instructions may be stored in a read-only memory (ROM) 202, random access memory (RAM) 203, or removable media (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external or internal display device), and may comprise one or more output device controllers 207, such as an image or video processor. One or more user input devices 208 may comprise a remote control, a keyboard, a mouse, a touch screen (which may be integrated with the display device 206), etc. The computing device 200 may also comprise one or more network interfaces, such as a network input/output (I/O) interface 209 (e.g., a network card) to communicate with the communications network 210. The network I/O interface 209 may be a wired interface (e.g., electrical, RF (via coax), optical (via fiber)), a wireless interface, or a combination of the two. The network I/O interface 209 may comprise a modem configured to communicate via the communications network 210. The communications network 210 may comprise the communications network 108 discussed above, along with any other desired network.

In some implementations, the computing device 200 may include a plug-in, applications, and/or software for various accessibility compliance test tools ("test tool(s)" 211), to be used in testing and/or scoring pieces of an application for its compliance to an accessibility provision. Examples of the test tools may include, but are not limited to: the Color Contrast Analyzer tool, e.g., to check whether colors of a content provide sufficient visibility; tools that check for the capability for screen reading; web accessibility evaluation tool (WAVE); etc. The test tools may be subdivided into local test tools and manual test tools. For example, local test tools may include, various extensions or plug-ins of a web browser (e.g., various GOOGLE CHROME Extensions (e.g., AXE CORE extension, GOOGLE LIGHTHOUSE, and MICROSOFT ACCESSIBILITY INISGHTS)). Manual test tools may include, but are not limited to: various screen readers, such as, APPLE VOICEOVER, the Job Access With Speech (JAWS), and the Non Visual Desktop Access (NVDA). The manual test tools may be combined with general knowledge of accessibility guidelines gained through training and/or experience to perform the manual testing. It may be possible for a combination of test tools to test a specific module or base code (e.g., a manual test tool may be augmented with automated scanning tools such as those provided by the various GOOGLE CHROME Extensions.)

Furthermore, the computing device 200 may have an application, program, software, and/or plug-in installed ("application" 216) for the user to assess and conform pieces of an application development (e.g., software development modules and/or their respective base codes) to accessibility guidelines using methods presented herein. The pieces of an application or application development may be compiled using compiler 214 (e.g., where the applications server 101 is implemented on the device 200) or may be received (e.g., where the applications server 101 is external). The application may also provide the user with details on the software development process, data regarding accessibility compliance for pieces of the application, and an analysis of defects. Furthermore, the application may allow the user, via input device 208, to resolve defects in the pieces of the application, e.g., to make the application more accessibility compliant. Furthermore, the user may decompile an existing application or application piece in order to resolve defects in the underlying source code, using compiler/decompiler 214. The application 216 may also rely on accessibility compliant source codes, base codes, and/or modules stored in code repository 204, e.g., to make the application more accessibility compliant. The code repository 204 may also or alternatively store versioned or packaged source codes, base codes, and/or modules, e.g., for existing applications or application pieces.

Although FIG. 2 shows an example hardware configuration for a computing device 200, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Figure 3:
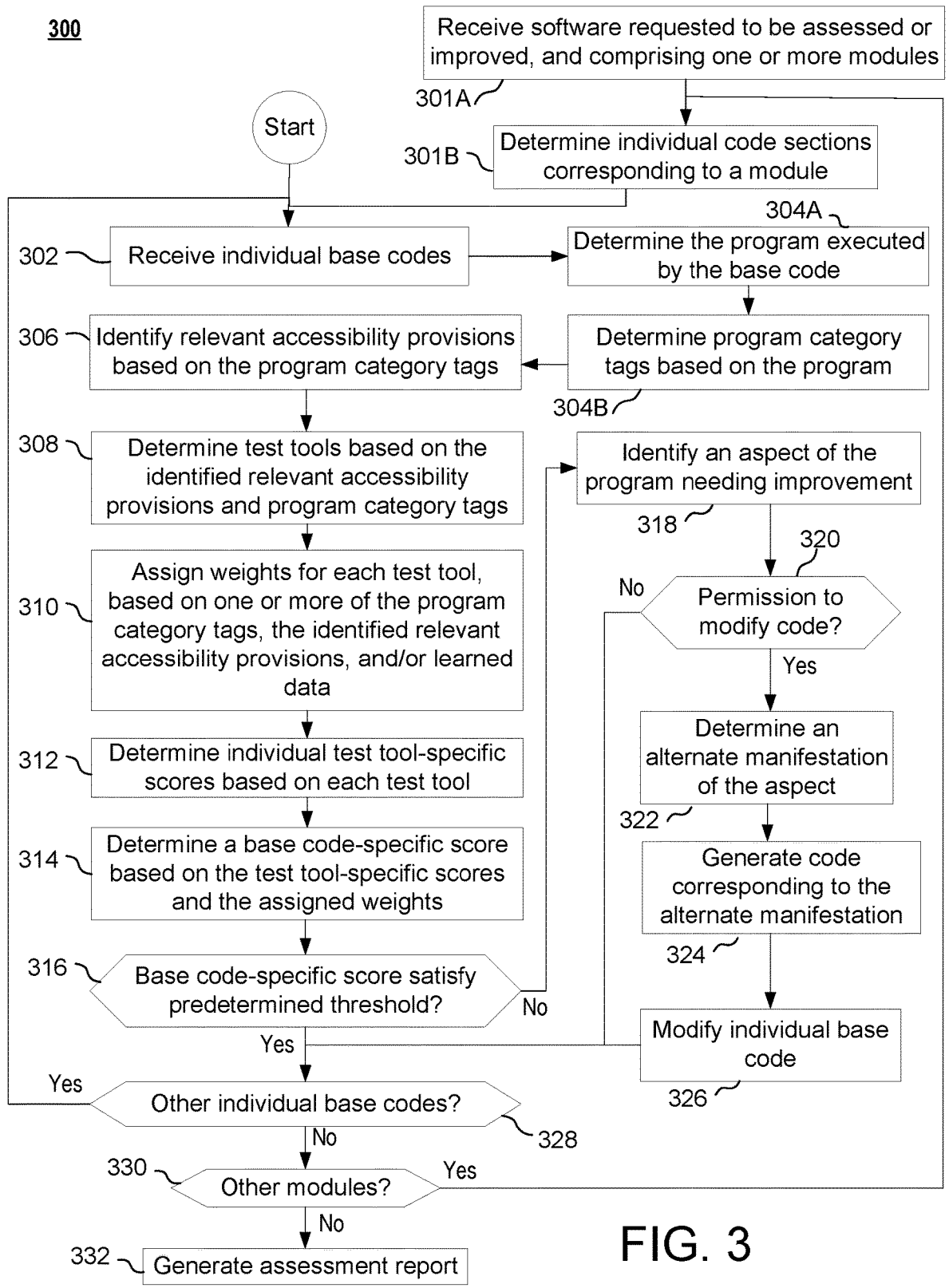
FIG. 3 illustrates a flow diagram of an example method for modular software development of accessibility for web applications in real-time, according to one or more aspects of the disclosure.

FIG. 3 illustrates a flow diagram of an example method 300 for modular software development of accessibility for web applications in real-time, according to one or more aspects of the disclosure. At least some steps of method 300 may be performed by one or more components of network 100 (e.g., applications server 101, accessibility compliance testing system 110, defect resolution system 118, device 150). Also or alternatively, at least some steps of method 300 may be performed by the device 200.

In some aspects, method 300 may be performed to test and reconfigure pieces of an existing software or application so that they are accessibility compliant (e.g., see steps 301A and 301B). For example, an existing software or application that is requested to be assessed or improved may be received by a device (e.g., device 150 of FIG. 1 or device 200 of FIG. 2) (e.g., as in step 301A). The received software may comprise one or more modules having one or more base code sections. At step 301B, a device (e.g., applications server 101, accessibility compliance testing system 110, device 150, etc.) may determine the individual base code sections corresponding to a module. In subsequent steps outlined herein (e.g., steps 302 through 330), one or more of these individual base code sections may be tested and/or modified for accessibility compliance.

Also or alternatively, method 300 may be performed during the course of an application or software development to assess and conform pieces of the software or application as it develops (e.g., individual base codes or modules) to accessibility guidelines. These steps may allow the software or application to develop to be accessibility compliant at the point closest to code creation.

Thus, at step 302, a device (e.g., accessibility compliance testing system 110, device 150, device 200, etc.) may receive an individual base code section. The individual base code section may be a part of an existing application or software or may be a part of an ongoing development of a software or application module.

After receiving the individual base code section, the device (e.g., device 150, device 200, etc.) may determine the program executed by the base code section. For example, a compiler (e.g., compiler/decompiler 122) may execute the individual base code to determine what program the individual base code generates (e.g., as in step 304A). The device may identify the program or determine the type of program by determining one or more program category tags based on the program (e.g., as in step 304B). In one aspect, metadata within the generated program may be detected and may be linked to one or more program category tags. Thus, if a sound is detected from the executed program, the device may place a program category tag on the individual base code that indicates that the individual base code generates a sound byte. Based on the determined program and/or determined program category tags, the device may identify relevant accessibility provisions for the individual base code (e.g., as in step 306). For example, if the device had determined that the individual base code produces a sound, the device may identify accessibility provisions relevant to audio content. The accessibility provision may include, for example, Guideline 1.4.2 of the Web Content Accessibility Guidelines (WCAG 2.0) (e.g., "If any audio on a Web page plays automatically for more than 3 seconds, either a mechanism is available to pause or stop the audio, or a mechanism is available to control audio volume independently from the overall system volume level.")

Also or alternatively, the device need not generate a program or program category tag to determine relevant accessibility provisions. For example, the device may rely on the individual base code itself (e.g., by detecting sections of the source code) to determine the relevant accessibility provisions.

At step 308, the device may determine one or more accessibility compliance testing tools ("test tool(s)" or "testing tool(s)") to test the individual base code. The one or more test tools may be based, for example, on the identified relevant accessibility provisions, the determined program executed by the base code, or the determined program category tags of the program executed by the base code. It is contemplated that each of the one or more test tools may generate an individual assessment, grading, or evaluation ("test tool-specific score" or "test tool-specific accessibility compliance score") that indicates how compliant the program generated by the individual base code is to the accessibility provisions corresponding to and tested by the test tool. A composite assessment, grading, or evaluation for an individual base code ("base code-specific score" or "base code-specific accessibility compliance score") may be determined based on the individual test tool-specific scores for an individual base code. Some test tools may be more relevant than others in testing the accessibility compliance for a specific individual base code. Thus, weights may be assigned for each of the determined test tools (e.g., as in step 310). The weights may be based, for example on the type or frequency of a program category tag, or the accessibility provision identified as relevant to the base code.

In some aspects, the weights may be based on trained data. For example, the weight of an assessment tool for a specific program category tag or accessibility provision may be determined by performing machine learning operations on training data. The training data may comprise a domain and a range. The range may include the results of various test tools for programs having specific category tags and/or having a specific accessibility provision that is relevant to those programs. The domain may include an evaluation or response of how accurately each of the various test tools predicted accessibility compliance of the specific programs. A supervised machine learning algorithm may be used to determine the relation between the domain and the range. The relation may be used to determine the weight to be used for each of the various test tools for a specific program or program category tag.

At step 312, the device may determine individual test tool-specific scores for the individual base code for each of the test tools determined in step 308. It is contemplated that each test tool may generate a score or assessment based on the one or more accessibility provisions that the test tool assesses. A base-code specific score may be a total or composite score for the individual base code, and may be determined based on the individual test tool-specific scores along with their respective assigned weights (e.g., as in step 314). The device may determine whether the base code-specific score satisfies a predetermined threshold (e.g., as in step 316). For example, the base code-specific score may be determined to satisfy the predetermined threshold if the base code-specific score is above, below, or within a range of a specified quantity. The satisfaction may indicate that the base code is determined to be accessibility compliant.

If the base code-specific score satisfies the predetermined threshold, the device may determine whether there are other individual base codes that have been developed and needs testing for accessibility compliance (e.g., as in step 328), as will be explained further below.

If the base code-specific score does not satisfy the predetermined threshold, the device may identify an aspect of the program generated by the base code (or an aspect of the underlying base code) that needs improvement (e.g., as in step 318). The device may perform this identification, for example, by analyzing the individual test tools-specific scores, identifying a test tool-specific score that particularly caused the base code-specific score to not meet the predetermined threshold, identifying the accessibility provision tested by the test tool that provided the test tool-specific score, and determining the underlying aspect of the program relevant to the accessibility provision. For example, if the test tool measures whether a specific audio file is able to deliver features called for in an accessibility provision (e.g., Guideline 1.4.2 of WCAG 2.0), and the test tool generates a low score, then the device may determine that the audio file of a specific program may need improvement.

In some aspects, the device may be able to automatically revise the individual base code so that the program it generates can be accessibility compliant. The device may initially determine whether it has permission (e.g., from the user) to modify the base code (e.g., as in step 320). For example, a user may choose to manually rewrite the base code to make the program it generates accessibility compliant, and thereby may not give the device permission to automatically modify the defective base code. The use may enter in a new code, for example, using input module 120, compiler/decompiler 122, and/or application builder 126.

If the device determines that it has permission to modify the base code, the device may determine an alternate manifestation of the aspect of the program, for example, that would render the program accessibility compliant (e.g., as in step 322). Thus, if an audio file lacks features that allow a user to pause or stop the audio as per Guideline 1.4.2 of WCAG 2.0, an alternate manifestation of the program would have a pause and stop button or other user interface functionality. The device may generate a code corresponding to the alternate manifestation (e.g., as in step 324). The generated code or the determination of the manifestation may be implemented via compiler/decompiler 122 and/or application builder 126. Also or alternatively, accessibility compliant versions for a plurality of aspects of programs (or their underlying code) may be available. For example, the accessibility compliant versions may be available via cloud, external systems, or local storage, e.g., in accessibility compliant code repository 124.

If the device determines that it does not have permission to modify the base code, the device may determine whether there are other individual base codes that have been developed and needs testing for accessibility compliance (e.g., as in step 328). Thus, pieces of the software or application may be tested and/or modified for accessibility compliance at the point close to code creation. Also or alternatively, an existing module of an existing software or application may be received by the device for testing and modification for accessibility compliance. As each module may include a plurality of base codes, step 328 may include determining whether there are other individual base codes for a given module. In either scenario, if there are other individual base codes, one or more of steps 302 through 328 may be repeated for the other individual base codes.

Furthermore, if there are no other individual base codes of a module to test and/or modify for accessibility compliance, the device may determine whether there are other modules of a software or application to be tested and/or modified for accessibility compliance (e.g., as in step 330). The other module may be from an existing software or application, or may be a newly developed module as part of an ongoing development of a software or application. If there are other modules, one or more of steps 301B and 302 through 328 may be repeated for the plurality of individual base codes for each of the other modules. If there no other modules, an assessment report may be generated that summarizes the accessibility compliance of a software or application (e.g., as in step 332).

Figure 4A:
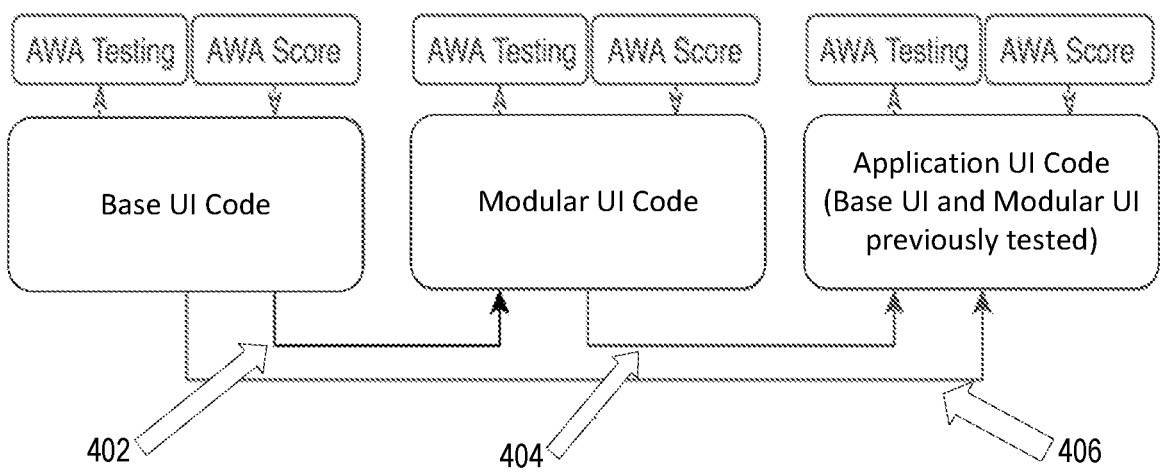
FIGS. 4A-4B illustrate flow diagrams of example methods of testing software development modules for accessibility compliance, resolving defects in the software development modules, and integrating the software development modules, according to one or more aspects of the disclosure.
Figure 4B:
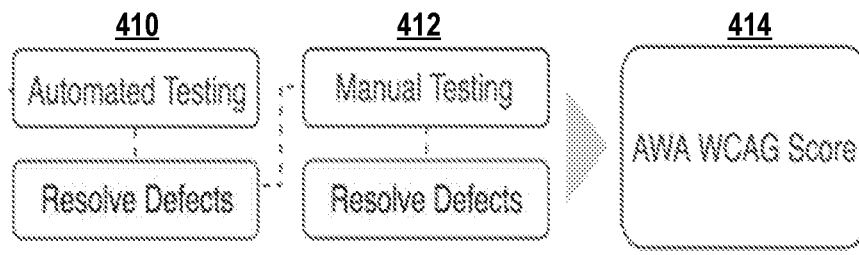

FIGS. 4A-4B illustrate flow diagrams 400A and 400B of testing software development modules for accessibility compliance, resolving defects in the software development modules, and integrating the software development modules, according to one or more aspects of the disclosure.

For example, flow diagram 400A of FIG. 4A illustrates how an example accessibility standard (e.g., accessibility for web applications (AWA) web content accessibility guidelines (WCAG)) can be used to test and process user interface components for base codes, modular codes, and application codes. The testing and processing of an application in piecemeal (e.g., by base codes, modules, etc.) can help to ensure predictable accessibility compliance tests and accessibility compliant results with each codebase type. At all levels of an application's user interface (e.g., at the system-side, modular, and/or base code levels), an application's components and subcomponents can be tested with AWA testing tools to ensure WCAG compliance before integration into other pieces of an application.

As marker 402 shows, base user interface codes may be tested for WCAG 2.0 AA standards using tools and processes directed by a testing platform (e.g., accessibility compliance testing system 110). Furthermore, as marker 404 indicates, modular UI components can be constructed of AWA tested WCAG compliant base UI components. Modular UI component may also be tested using tools and processes directed by the testing platform (e.g., test tools 112A-112C of accessibility compliance testing system 110). Thus, as shown in marker 406, an application can be constructed from the modular user interface components and the base user interface components tested by the platform. In some aspects, the one or more of the base user interface components and/or the modular user interface components can be stored in a library, in order to facilitate integration with other base code user interface components and/or with other modular user interface components.

Flow diagram 400B of FIG. 4B illustrates an example procedure for accessibility compliance to an accessibility standard (e.g., AWA WCAG) for a piece of an application (e.g., a module, base code, etc.). The application piece may be tested automatically (e.g., using systems and methods presented herein, e.g., in FIG. 3), and/or manually (e.g., using knowledge of accessibility guidelines).

The developer may also perform a comprehensive testing, e.g., via a system having a plurality of test tools 112A-112C and assigned weights 114A-114C. As shown in block 410, the AWA platform (e.g., device 150) may allow an automated testing of the application piece and an automated retooling or modification of the application piece within a quality control (QC) environment. Components of the AWA platform (e.g., test tools 112A-112C of device 150) may direct the testing of the piece for accessibility compliance. As described above, method 300 in FIG. 3 provides at least one method of providing an automated retooling or modification of an application piece based on an automated testing.

In some aspects, the automated testing shown in block 410 may involve initially testing at a smaller-scale before performing a more comprehensive testing. For example, a developer may perform an initial testing of the piece of the application, for example, by using a locally installed test tool to test the application piece for accessibility compliance. The developer may perform the initial testing of the application piece before performing a more comprehensive testing, e.g., using accessibility compliance testing system 110 of device 150. Based on the results of the initial testing, a developer may retool and/or modify the application piece to be more compliant with accessibility standards or otherwise yield a more favorable test result.

Furthermore, an automated testing, retooling, and modification of an application piece may be supplemented or replaced with manual testing (e.g., as shown in marker 412). Furthermore, the developer can manually retool or modify the piece of the application by recoding the piece of the application to be compliant to the accessibility standard (e.g., via input module 120).

Based on the various tests performed on the application piece (e.g., from various testing tools), an AWA WCAG score may be derived (e.g., as in marker 414). The AWA WCAG score may be a composite score that may place more priority (e.g., weight) to one or more test results over other test results. As explained previously, in conjunction with FIG. 3, the weights may be based on the application piece itself (e.g., the program, program category tag, etc.).

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention.

What is claimed is:

1. A method comprising:
  receiving, by a first computing device having at least one processor, a request to test a plurality of modules of a software application for accessibility compliance in real-time, wherein each of the plurality of modules comprises a plurality of base codes;
  for each base code of the plurality of modules of the software application:
    determining, based on one or more accessibility compliance provisions, one or more accessibility compliance test tools corresponding to the one or more accessibility compliance provisions; and
    determining a test tool-specific accessibility compliance score for each of the one or more accessibility compliance test tools;
  aggregating, for each of the plurality of modules of the software application, the test tool-specific accessibility compliance score of each of the one or more accessibility compliance test tools for each of the plurality of base codes;
  generating a plurality of module-specific accessibility compliance scores corresponding to the plurality of modules; and
  identifying, based on the plurality of module-specific accessibility compliance scores corresponding to the plurality of modules, one or more modules needing improvement in accessibility compliance.

2. The method of claim 1, further comprising:
  generating one or more accessibility-compliant modules to replace the one or more modules needing improvement in accessibility compliance.

3. The method of claim 2, further comprising:
  receiving a user input indicating a preference for the one or more accessibility-compliant modules.

4. The method of claim 2, further comprising:
  receiving an additional request to test an additional module of the software application for accessibility compliance.

5. The method of claim 1, wherein the aggregating the test tool-specific accessibility compliance score of each of the one or more accessibility compliance test tools for each of the plurality of base codes further comprises:
  assigning a weight to each individual accessibility compliance score of each of the one or more accessibility compliance test tools.

6. An apparatus comprising:
  one or more processors; and
  memory storing instructions that, when executed by the one or more processors, cause the apparatus to:
    receive a base code to be tested for accessibility compliance, wherein the base code is one of a plurality of components of a software module;
    determine a program executed by the base code;
    assign, based on the generated program, one or more program category tags;
    determine one or more accessibility compliance provisions corresponding to the one or more program tags;
    determine, based on the determined one or more accessibility compliance provisions, one or more accessibility compliance test tools corresponding to the one or more accessibility compliance provisions;
    determine a test tool-specific accessibility compliance score for each of the one or more accessibility compliance test tools;
    aggregate the test tool-specific accessibility compliance score of each of the one or more accessibility compliance test tools to generate a base code-specific accessibility compliance score for the base code; and
    determine, based on the base code-specific accessibility compliance score failing to satisfy a threshold, that the base code needs improvement in accessibility compliance, wherein the receiving the base code to be tested for accessibility compliance and the determining that the base code needs improvement in accessibility compliance occur in real-time.

7. The apparatus of claim 6, the memory storing instructions that, when executed by the one or more processors, cause the apparatus to:

identify, based on the test tool-specific accessibility compliance score of each of the one or more accessibility compliance testing tools, an aspect of the base code needing improvement in accessibility compliance.

8. The apparatus of claim 6, the memory storing instructions that, when executed by the one or more processors, cause the apparatus to,
modify the base code to generate an accessibility compliant base code.

9. The apparatus of claim 6, wherein aggregating the test tool-specific accessibility compliance scores to generate the base code-specific accessibility compliance score further comprises:
assigning a weight to each test tool-specific accessibility compliance score based on a degree of relevance of the one or more accessibility compliance provisions.

10. The apparatus of claim 6, the memory storing instructions that, when executed by the one or more processors, cause the apparatus to:
receive additional base codes to be tested for accessibility compliance, wherein the additional base codes are also components of the software module;
generate additional base code-specific accessibility compliance scores corresponding to the additional base codes; and
aggregate the base code-specific accessibility compliance score of the base code and the additional base code-specific accessibility compliance scores corresponding to the additional base codes to generate a module-specific accessibility compliance score for the software module.

11. The apparatus of claim 10, the memory storing instructions that, when executed by the one or more processors, cause the apparatus to:
determine, based on the module-specific accessibility compliance score failing to satisfy a threshold, that the software module needs improvement in accessibility compliance.

12. The apparatus of claim 11, the memory storing instructions that, when executed by the one or more processors, cause the apparatus to:
identify, based on one or more of base code-specific accessibility compliance score of the base code and the additional base code-specific compliance scores corresponding to the additional base codes, a defective base code needing improvement in accessibility compliance.

13. The apparatus of claim 12, the memory storing instructions that, when executed by the one or more processors, cause the apparatus to:
substitute an accessibility compliant base code for the defective base code needing improvement in accessibility compliance.

14. An apparatus comprising:
one or more processors; and
memory storing computer-executable instructions that, when executed by the one or more processors, cause the apparatus to:
receive, by a first computing device having at least one processor, a request to test a plurality of modules of a software application for accessibility compliance in real-time, wherein each of the plurality of modules comprises a plurality of base codes;
for each base code of the plurality of modules of the software application:
determine, based on one or more accessibility compliance provisions, one or more accessibility compliance test tools corresponding to the one or more accessibility compliance provisions; and
determine a test tool-specific accessibility compliance score for each of the one or more accessibility compliance test tools;
aggregate, for each of the plurality of modules of the software application, the test tool-specific accessibility compliance score of each of the one or more accessibility compliance test tools for each of the plurality of base codes;
generate a plurality of module-specific accessibility compliance scores corresponding to the plurality of modules; and
identify, based on the plurality of module-specific accessibility compliance scores corresponding to the plurality of modules, one or more modules needing improvement in accessibility compliance.

15. The apparatus of claim 14, wherein the memory stores additional computer-executable instructions, which when executed by the one or more processors, cause the apparatus to:
after determining the test tool-specific compliance score for each of the one or more accessibility compliance testing tools,
aggregate, for each of the plurality of base codes, the test tool-specific compliance score for each of the one or more accessibility compliance test tools to generate a base code-specific accessibility compliance score;
identify, based on a plurality of base code-specific accessibility compliance scores corresponding to the plurality of base codes, a defective base code needing improvement in accessibility compliance.

16. The of claim 14, wherein the one or more accessibility compliance test tools comprises one or more of:
a color contrast analyzer;
a tool to check for the capability for screen reading;
a web accessibility evaluation tool;
a web browser extension or plug-in; or
a screen reader.

17. The apparatus of claim 14, wherein the memory stores additional computer-executable instructions, which when executed by the one or more processors, cause the apparatus to:
receive a user input indicating a preference for the one or more accessibility-compliant modules.

18. The apparatus of claim 14, wherein the memory stores additional computer-executable instructions, which when executed by the one or more processors, cause the apparatus to:
generate one or more accessibility-compliant modules to replace the one or more modules needing improvement in accessibility compliance.

19. The apparatus of claim 14, the memory storing instructions that, when executed by the one or more processors, cause the apparatus to:
receive additional base codes to be tested for accessibility compliance, wherein the additional base codes are also components of the software module;
generate additional base code-specific accessibility compliance scores corresponding to the additional base codes; and
aggregate the base code-specific accessibility compliance score of the base code and the additional base code-specific accessibility compliance scores corresponding to the additional base codes to generate a module-specific accessibility compliance score for the software module.

20. The apparatus of claim 19, the memory storing instructions that, when executed by the one or more processors, cause the apparatus to:

determine, based on the module-specific accessibility compliance score failing to satisfy a threshold, that the software module needs improvement in accessibility compliance.

\* \* \* \* \*